July 21, 1959  A. J. GIRDWOOD ET AL  2,895,666
EXTERNAL ROTOR MOTOR FAN ASSEMBLY
Filed July 17, 1956  3 Sheets-Sheet 1

INVENTORS:
Arthur J. Girdwood
Elwaine W. Shifflett

ATTORNEY

July 21, 1959     A. J. GIRDWOOD ET AL     2,895,666

EXTERNAL ROTOR MOTOR FAN ASSEMBLY

Filed July 17, 1956     3 Sheets-Sheet 2

*INVENTORS:*
Arthur J. Girdwood
Elwaine W. Shifflett by

ATTORNEY

July 21, 1959 A. J. GIRDWOOD ET AL 2,895,666
EXTERNAL ROTOR MOTOR FAN ASSEMBLY
Filed July 17, 1956 3 Sheets-Sheet 3

INVENTORS:
Arthur J. Girdwood
Elwaine W. Shiffiett by
ATTORNEY

United States Patent Office 2,895,666
Patented July 21, 1959

2,895,666

EXTERNAL ROTOR MOTOR FAN ASSEMBLY

Arthur J. Girdwood and Elwaine W. Shifflett, Guelph, Ontario, Canada, assignors to Leland Electric Canada Limited, a corporation of Canada Application July 17, 1956, Serial No. 598,352

9 Claims. (Cl. 230—117)

This invention relates to blowers and, more particularly, to the type wherein the blower wheel is driven by an electric motor having a rotor external to and surrounding its stator.

Blower wheels of the centrifugal type are particularly adapted to be driven by electric motors which have their stators surrounded by the rotor element in order to take advantage of the relatively large diameter of the rotor which provides a convenient mounting for the blower cage. Heretofore, the cage has generally been assembled separately and then fastened as a unit to the rotor. Also in the past, the driving motor unit has been supported directly by the blower housing with the result that any objectionable mechanical vibrations are transmitted through the entire blower unit.

It is accordingly an object of the invention to provide an improved blower assembly in which the support for the blower cage is integral with the driving motor rotor.

It is another object of the invention to provide an improved mounting for a blower assembly in which the blower blades may be quickly added or removed individually from the motor after it has been mounted.

It is still another object of the invention to provide an improved blower assembly which allows a reduction in the necessary number of parts, simplification of assembly, and which allows the securing of a blower cage to a motor rotor without requiring the use of rivets, screws, bolts, welding or other fastening expedients.

It is a further object of the invention to provide a blower assembly having vibration reducing mountings, whereby vibrations transmitted to the housing and resulting from operation of the blower are reduced to a minimum.

For a better understanding of the invention, together with other and further objects thereof, reference is made to the following detailed description taken in connection with the accompanying drawings, in which.

Figure 1:
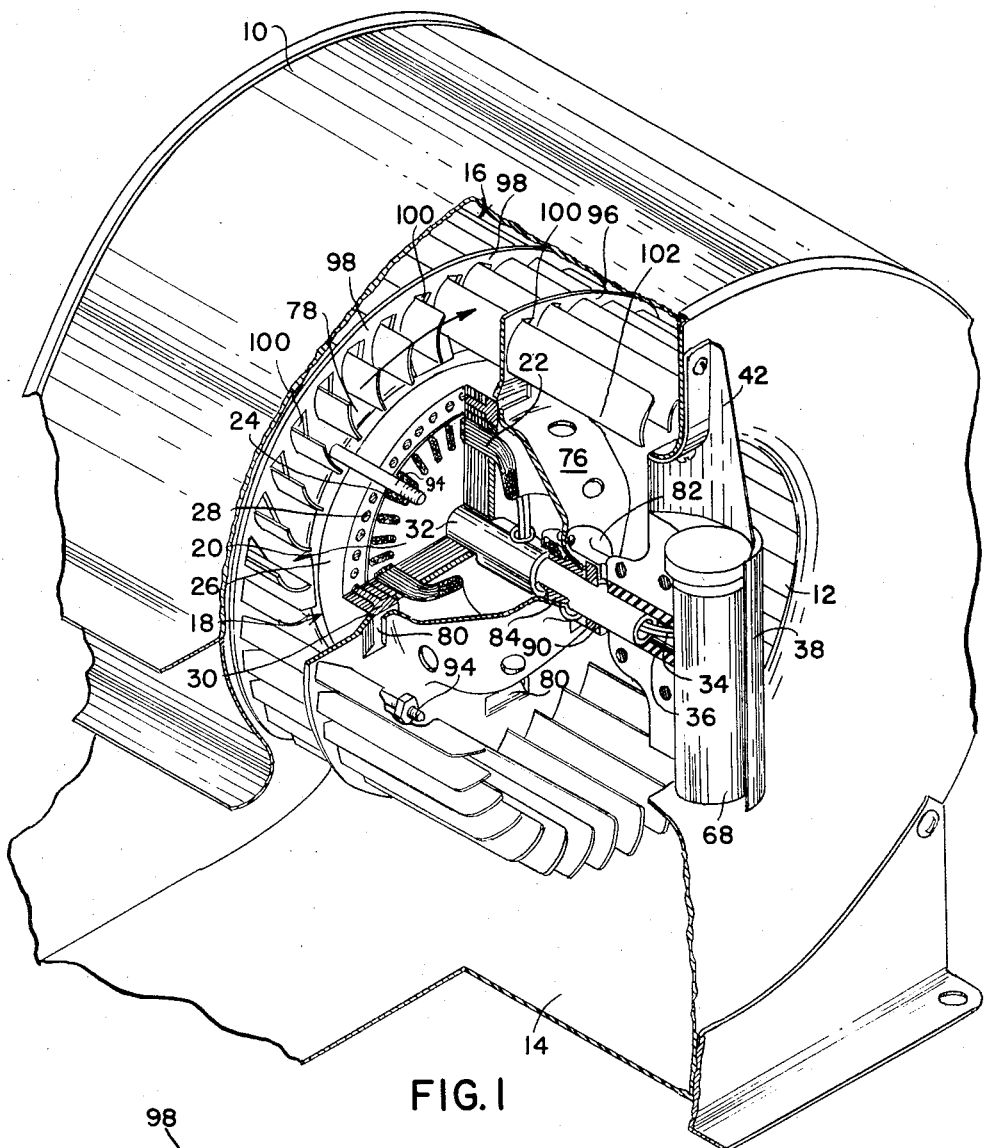
Fig. 1 is a perspective view of a blower assembly with a portion thereof broken away, representing an embodiment of the invention.

Referring now to the drawings, in Fig. 1 the blower is shown as having the customary blower housing 10 with inlet and outlet openings 12 and 14 respectively. Housing 10, which may be any suitable shape, surrounds a blower which in general comprises a centrifugal type blower wheel 16, driven by a motor generally indicated as 18. Motor 18 is preferably of the type having a rotor which revolves externally of, and surrounding the stator. Motors of this type facilitate the fastening to the rotors of annular devices of a relatively large diameter to be rotated thereby. Motor 18 is preferably an A.C., single phase, squirrel-cage type yet it may be a synchronous, shaded pole, three-phase, or any other type motor which is adapted to have stator windings internally disposed with respect to the rotor. It is understood that a motor adapted to run at two or more speeds may be used, and that conventional auxiliary equipment such as speed selecting switches or starting relays (not shown) may be utilized when necessary.

Motor 18 has a stator core 20 with conventional field windings 22 which pass longitudinally through slots 24 therein. Core 20 may comprise a plurality of laminations punched from magnetic sheet material with slot apertures therein, in accordance with conventional practice.

Figure 2:
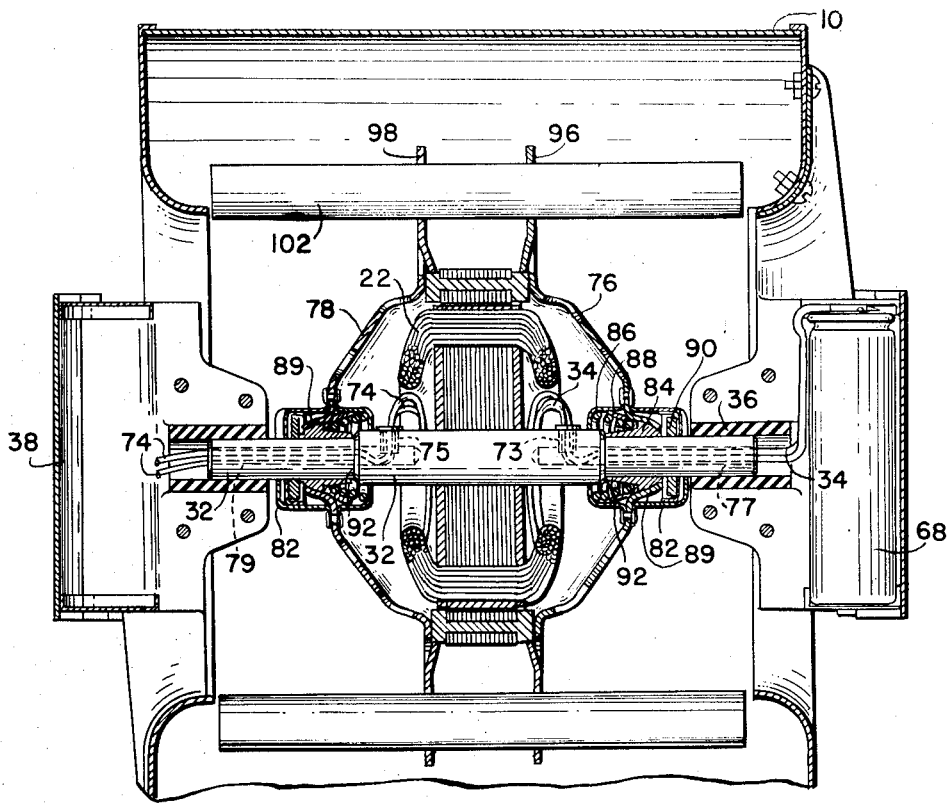
Fig. 2 is a sectional side elevation taken on the line 2—2 of Fig. 1.

Surrounding stator core 20 is a rotor 26 which, for purposes of illustration, is shown as being a squirrel-cage type assembled from a plurality of laminations and having conventional squirrel-cage rotor bars 28 passing longitudinally therethrough and terminating in an end shorting ring 30. Stator 20 is fastened by a key, screws or other conventional means to a stationary support 32 which is preferably a non-rotatable, substantially hollow shaft of suitable cross-section (Fig. 2). Shaft 32 serves also as a conduit for electrical connecting leads 34, 74 which respectively connect a starting capacitor 68 to the motor circuit and conduct electrical energy to stator windings 22. Support shaft 32 has radial ducts 73, 75 for receiving conductors 34, 74 respectively and guiding them inwardly into conduit 77 and 79 of shaft 32. Shaft 32 is immovably supported in an anti-vibration type mounting which has a grommet or sleeve 36 of resilient material held in place by means of a bracket assembly generally indicated as 38.

Inasmuch as shaft 32 provides only a support and does not rotate, it may be made of any suitable material. Thus, hollow insulating materials through which the conductors 34, 74 are passed may be used. The hollow portion may be impregnated or filled with a potting compound such as a suitable resin to effectively seal the conduit.

Figure 3:
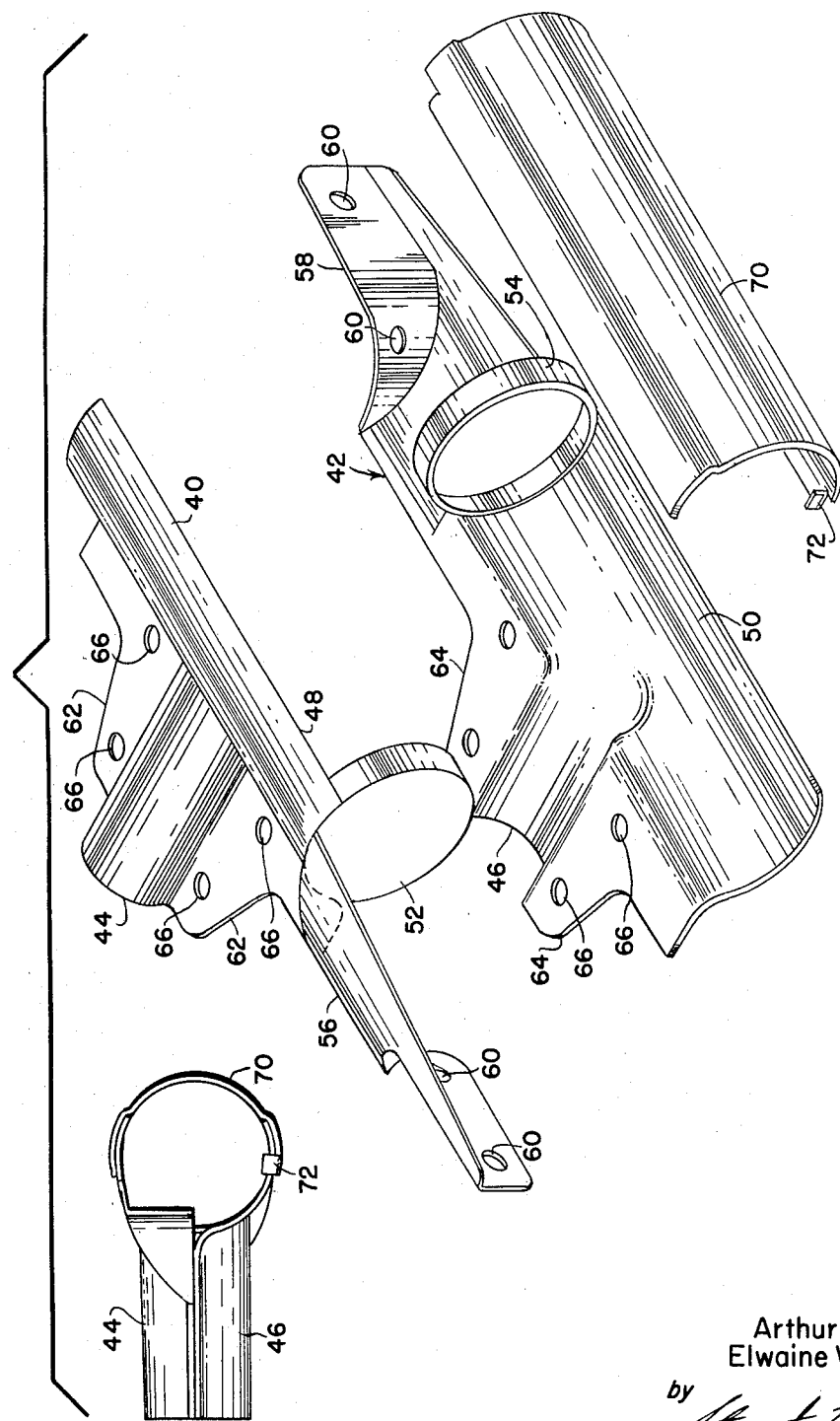
Fig. 3 is an exploded view of the blower assembly mounting brackets.

Bracket assembly 38, shown in more detail in Fig. 3, has a pair of shells 40, 42 which have channels 44 and 46 respectively stamped or pressed therein. Each shell also has a channel 48 and 50 transversely disposed with respect to channels 44 and 46, and a cap or lid 52, 54 positioned near the end of channels 48 and 50 respectively. Each shell also has a wing member 56, 58, with apertures 60 therein for receiving fasteners for fastening the bracket assembly 38 to an end of housing 10, and a shoulder portion 62, 64. When the shells 40, 42 are arranged in a cooperating relationship whereby shoulders 62, 64 lie in register with each other, apertures 66 in each shoulder are thereby aligned and provide holes through which clamping fasteners, such as suitable bolts, may be inserted. Also, when the shells 40, 42 are assembled, channels 44, 46 form a tube or conduit for poistioning resilient grommet 36, and additionally serve as means for clamping conduit or shaft 32 in a secured but vibrationless position, since vibrations generated by the motor or blower fan are attenuated by the resilient grommet. Channels 48, 50 and caps 52, 54 also cooperate when shells 40, 42 are assembled to form a receptacle for mounting the usual motor starting capacitor 68 for motors of the type described. Before the bolts passing through apertures 66 are tightened, the bracket, with associated grommet 36, is slid onto shaft 32 and affixed to housing 10 by means of suitable fasteners, such as bolts and nuts, passing through wings 58, 60. The bracket is then tightened about grommet 36 to securely position duct shaft 32.

To complete the bracket assembly, an arcuate shell 70 is snapped into position about caps 52, 54 and acts as a cover for capacitor 68. Shell 70 has inwardly extending lips or tabs 72 which serve to maintain the shell in proper position on assembly 38.

It will be seen that bracket 38 provides an anti-vibration support for the blower motor 18 and also serves as a box or receptacle for the motor starting capacitor. A second bracket identical to bracket 38, but without the capacitor 68, may be affixed to the opposite end of blower housing 10 to support the left-hand end of the motor stationary shaft 32 in a manner identical with the anti-vibration support just described. The space usually filled by the capacitor 68 may be employed to provide a housing or terminal box for the power lines joined at that point to the stator conductor leads 74.

The rotor 26 has an annular configuration and may be formed from a plurality of laminations which are suitably punched from magnetic material to the desired shape and dimensions. The laminations may have apertures for receiving the rotor bars 28, which preferably may be cast therein under pressure. Casting rotor bars 28 and associated ring 30 together provides an electrical bond therebetween and also serves to physically support and integrate the rotor laminations. The dimensions of the rotor are such that it surrounds but clears the fixed stator by an incremental amount so that the proper magnetic path between the rotor and stator is achieved but free rotation of the rotor is provided.

The rotor is maintained and supported in proper alignment with the stator by means of end shields 76, 78 which abut each rotor end surface. End shields 76, 78 have a plurality of struck-up portions or arcuate lips 80 which engage the outer periphery of the rotor near each edge thereof to maintain the rotor in a concentric relationship with stator 20.

Each end shield also has a housing 82 secured thereto which houses a conventional self-aligning bearing unit comprising bearings 84, aligning springs 86, collars 88 for positioning springs 86, seats 89 for bearings 84, and packing washers 90 which aid in lubricating the bearings 84. A shoulder 92 near each end of conduit 32 provides a lateral thrust bearing surface for each bearing 84. Rotor 26 is securely clamped between end shields 76, 78 by means of through bolts 94 which extend longitudinally between suitable apertures in each end shield. Due to the self-aligning characteristics of bearing 84, the rotor is maintained in proper concentric and transverse alignment with stator 20. Of course, any other suitable type of bearing structure, such as conventional ball bearings, may be used, if desired.

Figure 4:
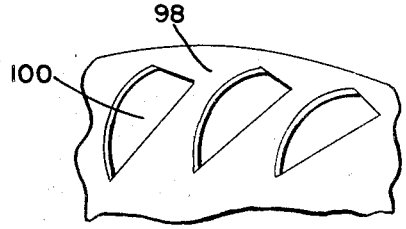
Fig. 4 is a fragmentary view of a length of rotor end shield flange showing arcuate slots for holding the blower vanes.

End shields 76, 78 have outwardly extending flange portions 96, 98 respectively which have a plurality of arcuate slots 100 cut, punched, or stamped therein at spaced intervals about the periphery thereof which are adapted to receive the blower vanes 102. Vanes 102 are preferably formed of flat, springy sheet metal which has been pressed to the desired curved form before assembly in flanges 96, 98. Slots 100 may be of the configuration shown in Fig. 4 and so shaped that vanes 102 may be inserted lengthwise into the slots and then pressed rearwardly against the direction of rotation as indicated by the arrow in Fig. 1 whereby the force exerted by the moved air will aid in holding the vanes in position. Slots 100 are so dimensioned that when the vanes are pressed rearwardly, they are caused to close somewhat upon themselves, that is, assume a more circular shape, and thus are maintained under compression in a rigid, secure position between flanges 96, 98. With slots of the configuration illustrated in Fig. 4, the vanes 102 are retained in flexed condition, so that each vane offers a concave, air moving surface, because the vanes are held between the bottoms of the slots and the ends of the curved side wall of the slots.

Figure 5:
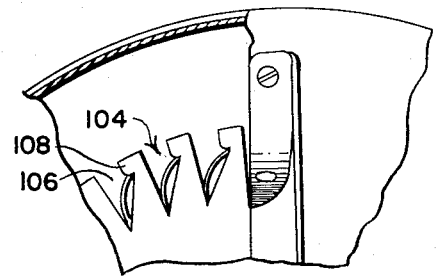
Fig. 5 is a fragmentary view of a modification of the vane holding slots.

If desired, the slot configuration 104 shown in Fig. 5 may be formed in flanges 96, 98. Such slots have mouths 106 opening radially outward to the edge of flanges 96, 98 and lip portions 108 extending partially across mouth 106. In assembly, vanes 102 may be compressed sufficiently to be forced into a desired position under lip 106, whereupon the blade secures itself in a substantially immovable position. Thus, slots, having the configuration of slots 104, allow each vane to be inserted edgewise and quickly snapped into position, thus eliminating endwise insertion of the vanes. To facilitate the positioning of the vanes, indentations or notches may be formed therein at suitable intervals to engage flanges 96, 98 so as to prevent axial movement of the vanes.

It will be seen that, since a separate blower wheel construction which must be later attached to the rotor is eliminated by the present invention, a very simple, easily mass-produced blower is provided which uses a minimum of individual parts. It will be further noted that a non-vibration transmitting external rotor motor has been provided in which a blower support is integral with the rotor, so that to complete the blower assembly fan blades need only be slipped into the slots provided in the rotor supports.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

What is claimed is:

1. A blower assembly comprising a stationary support, a stator axially mounted on said support, a housing surrounding said support, brackets attached to each end of said housing and having means for cooperatively engaging said support, said brackets each having a resilient insert adapted to receive said support shaft to prevent the transmission of vibrations from said shaft to said housing, a rotor surrounding said stator and axially aligned therewith, end shields rotatably mounted on said support and abutting each end of said rotor to rotatably support said rotor in spaced relationship to said stator, said end shields having integral, radially extending flanges with spaced slots therein near the outer periphery thereof, and blower vanes extending through opposite pairs of slots in each of said end shields and immovably supported thereby.

2. The invention defined in claim 1, wherein said slots in said end flanges have a configuration operative to resiliently bend said vanes longitudinally to form a concave, air moving surface when said vanes are forcibly fitted into said slots.

3. A blower assembly comprising a stationary support shaft, a stator axially mounted on said support, a housing surrounding said support shaft, brackets attached to each end of said housing and having means for cooperatively engaging said support shaft, said brackets comprising a body portion and outwardly extending wing portions, each of said wing portions having means for removably fastening said brackets to said housing, a resilient sleeve disposed in each of said body portions for receiving each end of said support shaft, and clamping means for immovably securing said support shaft in said resilient sleeve, a rotor surrounding said stator and axially aligned therewith, end shields rotatably mounted on said support and abutting each end of said rotor to rotatably support said rotor in spaced relationship to said stator, said end shields having integral, radially extending flanges with spaced slots therein near the outer periphery thereof, and blower vanes extending through opposite pairs of slots in each of said end shields and immovably supported thereby.

4. A blower assembly comprising a stationary support, a stator axially mounted on said support, a rotor surrounding said stator and axially aligned therewith, end shields rotatably mounted on said support and abutting each end of said rotor to rotatably support said rotor in spaced relationship to said stator, said end shields having blower vane mounting means integral therewith and disposed near the outer periphery thereof, and having inwardly extending tab portions for engaging the outer periphery of said rotor to concentrically align said rotor with said stator, and a plurality of blower vanes secured to said rotor by said mounting means.

5. A blower assembly comprising a stationary support, a stator axially mounted on said support, a rotor surrounding said stator and axially aligned therewith, end shields rotatably mounted on said support and abutting each end of said rotor to rotatably support said rotor in spaced relationship to said stator, said end shields having blower vane mounting means integral therewith and disposed near the outer periphery thereof, a plurality of blower vanes secured to said rotor by said mounting means, said end shields having outwardly extending tab portions for engaging the outer periphery of said rotor to concentrically align said rotor with said stator, and clamping means extending between said end shields to align said rotor therebetween.

6. A blower assembly comprising a stationary support, a stator axially mounted on said support, an annular rotor member surrounding said stator and axially aligned therewith, end shields rotatably mounted on said support and abutting each end of said rotor to rotatably support said rotor in spaced relationship to said stator, said end shields having integral, radially extending flanges with spaced slots therein near the outer periphery thereof, blower vanes extending through opposite pairs of slots in each of said end shields, each of said slots having a mouth opening into the outer edge of said flange and having a lip portion extending partially across said mouth to immovably secure said vanes in a flexed condition when said vanes are inserted into said slots and forced under each of said lips.

7. A blower assembly comprising a stationary support; a stator mounted on said support; an annular rotor surrounding said stator and disposed concentric thereto; a pair of end shields rotatably mounted on said support and each abutting a different end of said rotor to support said rotor rotatably in spaced relationship to said stator, each of said end shields being provided with an outer, annular flange concentric with respect to the axis of said stator and lying in a plane transverse to said axis, each of said flanges being provided with a series of annularly spaced, generally radially extending slots, each of said slots having generally outwardly diverging side walls; and a plurality of blower vanes each extending through one of said sots in each end shield, said vanes being formed of resilient sheet material, one side wall of each of said slots being provided with generally radially spaced vane-retaining shoulder means, the spacing between said shoulder means being less than the width of the corresponding blower vanes at the portion of the vane passing through such slot, and each of said vanes being retained in flexed condition by reason of engagement of the vane between said shoulder means.

8. A blower assembly in accordance with claim 7 and wherein said slots each have a mouth which opens into the outer rim of the flange in which such slot is provided.

9. A blower assembly comprising a stationary support, a stator axially mounted on said support, a housing surrounding said support, brackets attached to each end of said housing and having means for cooperatively engaging said support, said brackets having outwardly extending wing portions, each of said wing portions having mating channels adapted to form a receptacle for mounting a capacitor on said housing, a rotor surrounding said stator and axially aligned therewith, end shields rotatably mounted on said support and abutting each end of said rotor to rotatably support said rotor in spaced relationship to said stator, said end shields having radially extending flanges, and blower vanes extending through said flanges in each of said end shields and immovably supported thereby.

References Cited in the file of this patent
UNITED STATES PATENTS

| | | |
|---|---|---|
| 1,921,218 | Colby | Aug. 8, 1933 |
| 2,044,028 | Szekely | June 16, 1936 |
| 2,772,046 | Shomphe | Nov. 27, 1956 |
| 2,776,088 | Wentling | Jan. 1, 1957 |